United States Patent [19]

DeLorean

[11] Patent Number: 4,557,232

[45] Date of Patent: Dec. 10, 1985

[54] SWASH PLATE ENGINE

[76] Inventor: John Z. DeLorean, 834 Fifth Ave., New York, N.Y. 10021

[21] Appl. No.: 694,156

[22] Filed: Jan. 23, 1985

Related U.S. Application Data

[62] Division of Ser. No. 383,989, Jun. 1, 1982, Pat. No. 4,515,113.

[51] Int. Cl.[4] .............................................. F02C 7/26

[52] U.S. Cl. .............................. 123/320; 123/179 F; 60/628

[58] Field of Search ............... 123/320, 179 E, 179 F, 123/2; 91/449, 502; 60/712, 625, 626, 627, 628, 629

[56] References Cited

U.S. PATENT DOCUMENTS

| | | | |
|---|---|---|---|
| 3,130,540 | 4/1964 | Manning et al. | 123/179 F |
| 3,234,889 | 2/1966 | Cooper et al. | 60/629 |
| 3,459,165 | 8/1969 | Bender et al. | 60/626 |
| 3,626,918 | 12/1971 | Brenneke | 123/179 E |
| 4,380,904 | 4/1983 | Zappia | 60/712 |

*Primary Examiner*—Craig R. Feinberg
*Assistant Examiner*—David A. Okonsky
*Attorney, Agent, or Firm*—Kenyon & Kenyon

[57] ABSTRACT

The swash plate engine is provided with an Aspin type rotary valve system with a variable compression capability. The engine may be of four-piston type or six-piston type. The size of the combustion chambers can be changed from time to time to vary the compression ratio. The engine may also be coupled with an accumulator to store the energy of braking for subsequent acceleration of the engine.

3 Claims, 9 Drawing Figures

SWASH PLATE ENGINE

This is a division of application Ser. No. 383,989 filed June 1, 1982 and now U.S. Pat. No. 4,515,113.

This invention relates to an internal combustion engine having a variable compression ratio. More particularly, this invention relates to a swash plate engine.

Heretofore, various types of engines have been known for generating power for use, for example, in propelling automobiles. These engines include various types of internal combustion engines which have been constructed with pistons mounted for reciprocation in cylinders via use of a swash plate such that, as one piston is in a compression stroke, the other is in an exhaust stroke. However, in many cases, these engines have not been highly efficient or quiet in operation.

Generally, the conventional engine used in a vehicle, such as an automobile, has a fixed compression ratio, i.e. the volume within a cylinder when a piston is at the bottom of its stroke divided by the volume within the cylinder when the piston is at the top of its stroke. In such cases, the peak pressures increase with load. Normally, increasing load results in increased fuel to the engine to maintain speed with full opening giving maximum peak pressures. Thus, it has also been known to provide engines with controlled variable-compression-ratio pistons so that the compression ratio of the engines can be changed from time to time by adjusting these pistons. However, these engines have been relatively complicated.

Accordingly, it is an object of the invention to provide a variable compression ratio engine of relatively simple construction.

It is another object of the invention to provide a fuel-efficient engine.

It is another object of the invention to provide a fuel-efficient engine which is operable with a minimum of noise.

Briefly, the invention provides, in one simple structure, a swash plate engine with an Aspin type rotary valve system having a variable compression capability.

The engine comprises an engine block with at least one cylinder chamber, an intake duct which extends to the chamber to deliver a combustible medium thereto and an exhaust duct which extends from the cylinder chamber to exhaust a combustion gas therefrom. In addition, a sleeve which has a closed end to define a cavity is rotatably and axially mounted in the chamber and has a port to communicate the cavity with a selected one of the intake and exhaust ducts. Also, a piston is slidably mounted in the cavity of the sleeve to define a compression chamber therewith.

The engine also has a transmission means linking reciprocation of the piston with rotation of the sleeve such that the port can alternately communicate with the intake and exhaust ducts. Also included is a means for moving the sleeve axially in the block relative to the piston in order to adjust the compression chamber in volume, and, thus, the compression ratio.

The transmission means includes one means, such as a shaft on which a swash plate is mounted and which is rotatably mounted in the cylinder block, for reciprocating the piston as well as a second means which is connected with the shaft for rotating the sleeve. This second means includes a gear mounted on the shaft which is in meshing engagement with a gear mounted on the sleeve. This second means includes a gear mounted on the shaft which is in meshing engagement with a gear mounted on the sleeve. In one embodiment, the sleeve rotates at one half the speed of the shaft and swash plate. Thus, as the shaft moves from a 0° position to a 180° position, the piston moves from the top of its stroke, i.e. within the sleeve, to the bottom of its stroke, i.e. retracted from the sleeve. As the shaft then moves to a 360° position, the piston moves back into the sleeve to the top of its stroke. During this time, the sleeve rotates 180° for example from the intake duct. In another embodiment, the rotary sleeve rotates in a 1:1 gear ratio with the shaft. In this case, the swash plate may be of a sinusoidal shape to effect four phases of the rotary sleeve in one revolution.

In operation, as the shaft rotates, the piston is reciprocated via the swash plate in a rectilinear manner while the sleeve is rotated. The sequence is such that, in the first embodiment, with a port in the sleeve communicating the intake duct with the compression chamber, the shaft rotates from a 0° position to a 180° position and the piston moves from the top of its stroke to the bottom of its stroke effecting a "filling" stroke to permit filling of the chamber with the combustible medium. Continued rotation of the shaft to a 360° position causes the sleeve to move the port therein away from the intake duct. During this time, the piston reverses and effects a "compression" stroke while the port is blocked. Thereafter, the port in the sleeve exposes the compression chamber to an ignition means so that ignition takes place and the piston again withdraws from the chamber to effect a "power" stroke. During this time, the shaft moves to a 540° position while the sleeve rotates 90°. Upon completion of the "power" stroke of the piston, the piston begins to again move into the sleeve while the port in the sleeve comes into communication with the exhaust duct. The combustion chamber is then flushed of the combustion gas as the shaft moves to a 720° position.

The engine can be constructed with pairs of axially aligned cylinder chambers disposed circumferentially about the longitudinal axis of the shaft while intake and exhaust ducts communicate with each of the cylinder chambers. In this case, each piston can be disposed axially of a respective pair of aligned cylinder chambers with a piston head at each end slidably mounted in a respective sleeve to define the combustion chambers therein. Further, a single swash plate may have all of the pistons mounted thereon for reciprocation in the respective sleeves during rotation of the shaft so that as one piston of a piston pair extends into a compression chamber, the other piston retracts from a compression chamber. Likewise, a gear can be arranged on each sleeve to mesh with one of two gears mounted on the shaft for synchronized rotation with the shaft.

In order to permit an adjustment of the sleeves, the gears on the sleeves are sized to slide axially along the gears on the shaft without disengaging.

The means for axially moving each sleeve may include a pressure medium actuated piston which abuts a face of the sleeve and which can be controlled by a suitable control means or system via appropriate porting for a pressure medium. The control means or system is suitably connected to the sleeve in order to control the compression ratio. In this regard, the control piston is moved away from the sleeve in order to permit the sleeve to travel in a direction away from the piston face to thereby reduce the compression ratio. In turn, the reduction of the compression ratio would reduce peak pressure.

The piston may be of any suitable construction. For example, the piston may have a semi-spherical head or conical head while the sleeve defines a cavity shaped to matingly receive the piston head. Further, to accommodate mounting on a swash plate, the piston can have a shoe with a semi-spherical recess which is mounted in mating relation on a semi-spherical head on the swash plate.

In another embodiment, the rotary valve sleeve may be constructed in integral manner with a gear to form a combined cylinder and rotary valve.

In still another embodiment, the engine is provided with a means to provide for a variable valve timing. In this case, a rod is reciprocally mounted concentrically within the main shaft and carries two radially directed forks, each of which cradles a helical gear. Each gear, in turn, meshes with a rotary valve sleeve gear. By moving the rod, the relationship of the helical gears to each other is changed such that the port timing is changed.

The shaft of the engine block may be connected via a clutch to a suitable transmission for delivering power to a drive train.

A suitable ignition means may be provided for igniting the combustible medium in the respective compression chambers of the engine. For example, ignition of the combustible medium can be supplied by a spark through an opening in the engine block when the port in the sleeve reaches that opening. In this case, the opening would be displaced to a point between the intake duct and exhaust duct to permit passage of the spark from the ignition means.

Further, the engine block can be constructed to receive a stratified charge. In this case, the engine block is provided with an additional intake duct for delivering a very rich mixture to the compression chamber after filling of the chamber with a lean mixture. This very rich mixture is then rotated to the ignition means in a stratified condition and fires the whole chamber. Further, the engine can be adapted for multi-fuel use.

The swash plate may be mounted on the shaft in tension for force balance.

Since the engine is constructed with a rotary valve, "no-knock" sensitivity is particularly low, such as is the case for known Aspin rotary valve engines.

Further, since the volume of the compression chambers can be varied, a constant peak pressure can be achieved and maintained during operation.

The fuel which is used in the engine may be gasoline or liquified natural gas. When used, the fuel is vaporized and mixed with air to form a very lean but combustible mixture. The fuel is then injected at constant mixture ratio into a cylinder with the injection pressure controlling the amount of charge. For example, the mixture may have a 20 to 1 to a 30 to 1 mixture. A positive displacement pump with a regulator to measure the charge from the duct may be used. Further, the fuel could be vaporized in any manner such as sonically thermally or mechanically.

These and other objects and advantages of the invention will become more apparent from the following detailed description taken in conjunction with the accompanying drawings in which.

Figure 1:
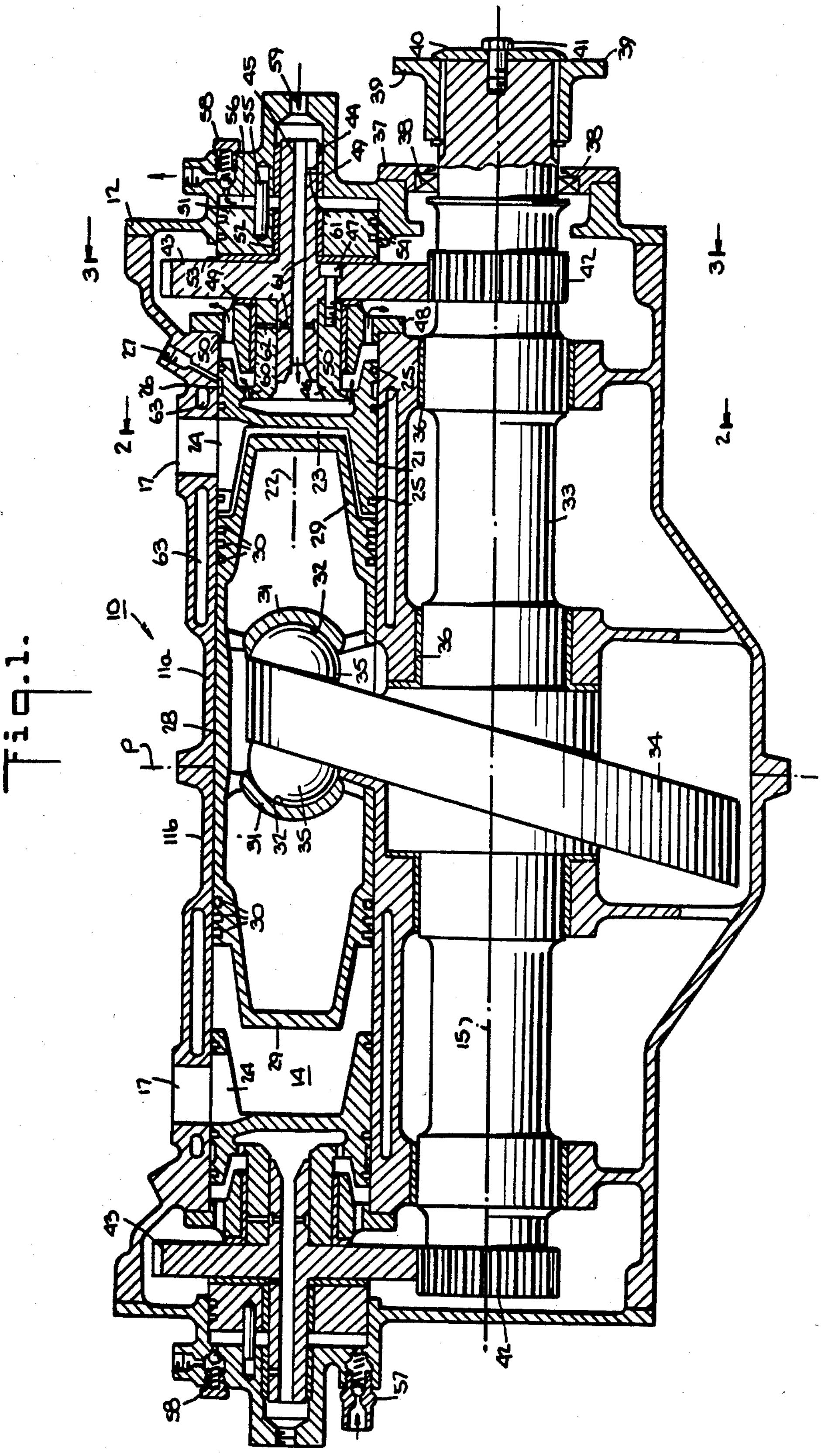
FIG. 1 illustrates a cross-sectional view of a swash plate engine constructed in accordance with the invention.

Referring to FIG. 1, the engine 10 includes a cylinder block 11 which is constructed in two halves 11*a*, 11*b* which are secured together, for example via bolts (not shown) in symmetrical relation about a center plane P as well as heads 12 which are secured to the respective block half via bolts (not shown). Only the block half 11*a* will be described in the following for simplicity.

The cylinder block 11 has pairs of axially aligned cylinder chambers 14 (e.g. three pairs for a six cylinder engine) which are disposed circumferentially around a longitudinal axis 15 and duct means communicating with each cylinder chamber 14.

Figure 2:
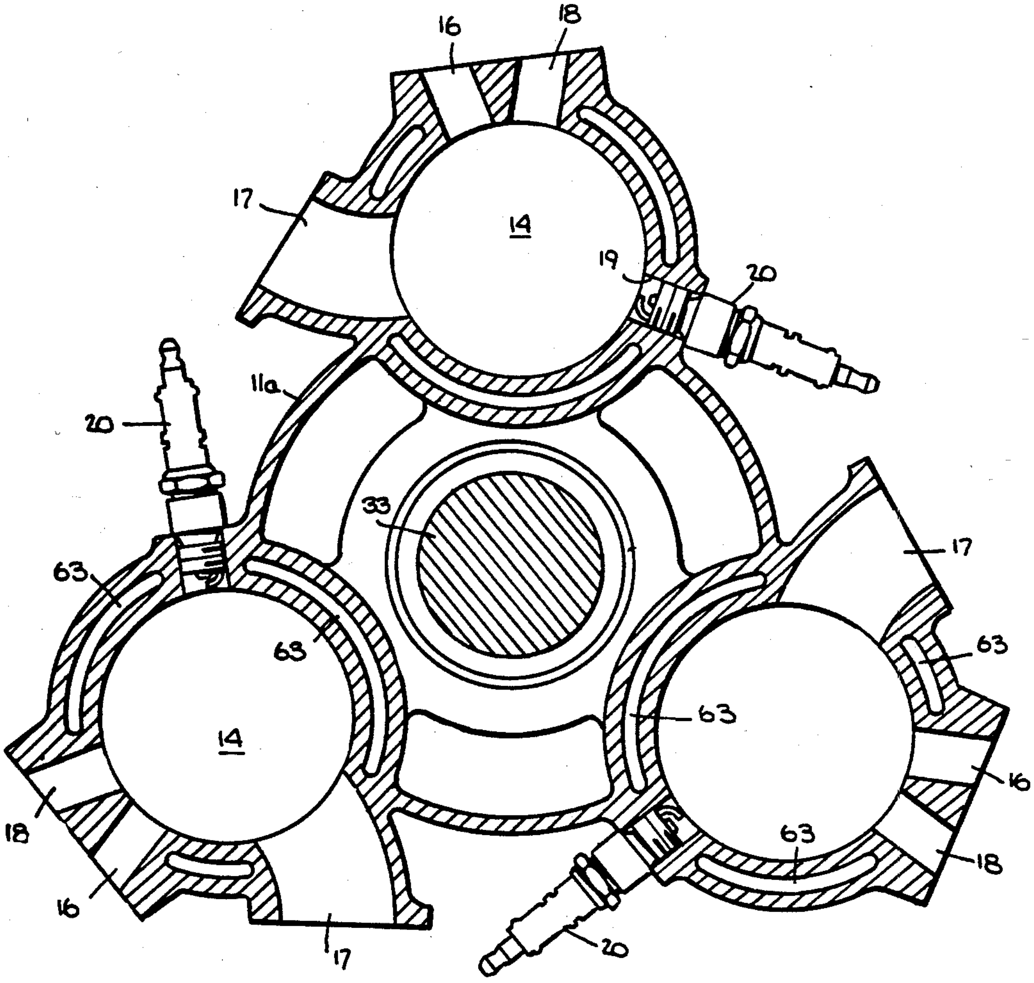
FIG. 2 illustrates a view taken on line 2—2 of FIG. 1 through the ducting of the engine.

Referring to FIG. 2, the duct means in each block half includes an intake duct 16 which extends through the side of the block 11 to a respective chamber 14 in order to deliver a combustible medium thereto as well as an exhaust duct 17 which extends through the block 11 from a respective chamber 14 in order to exhaust a combustion gas therefrom. Each exhaust duct 17 may have a liner (not shown) to protect the walls of the duct 17 against the flow of a hot combustion gas. In addition, the duct means includes a second intake duct 18 for delivery of a very rich mixture to the chamber 14 and a bore 19 in which an ignition means 20, such as a spark plug is provided.

Referring to FIG. 1, each chamber 14 houses a rotary valve in the form of a sleeve 21 which is rotatably and axially mounted in each chamber 14 about an axis 22. As shown, each sleeve 21 is closed at one end to define an internal cavity 23 and has a port 24 which communicates the cavity 23 with a selective one of the intake and exhaust ducts 16, 18 17 during rotation of the sleeve 21. Suitable sealing rings 25 are also provided between each sleeve 21 and the housing block half 11*a* while a fluid bearing 26 is located between each sleeve 21 and the housing block half 11*a* to accommodate rotation of the sleeve 21 within the housing block half 11*a*. As indicated, a suitable fluid inlet 27 is provided in the cylinder block half 11*a* to deliver fluid to the fluid bearing 26.

A piston 28 is disposed axially of a respective pair of aligned cylinder chambers 14 and has a piston head 29 at each end slidably mounted in a cavity 23 of sleeve 21 in order to define a compression chamber. As indicated, each piston head 29 carries piston rings 30 for sliding within the block half 11*a* in seal tight manner. Each piston 28 is generally of hollow construction and includes a shoe 31 within each piston head 29 which has a hemi-spherical recess 32 at one end.

Transmission means are provided for reciprocating each piston 28 within a pair of sleeves 21 while rotating each sleeve 21 about its axis 22 to alternately communicate the port 24 in each sleeve 21 with the intake ducts 16, 18 and exhaust duct 17. This transmission means includes a shaft 33 which is rotatable about the longitudinal axis 15 of the cylinder block 11 and which carries a means, such as a swash plate 34 which is angularly mounted on the shaft 33 under tension in order to provide a balance. The swash plate 34 is mounted in any suitable manner to follow the rotation of the shaft 33. As shown, the swash plate 34 carries hemi-spherical heads 35 (i.e. three on each side) each of which is matingly received in a recess 32 of a shoe 31.

As shown, the shaft 33 is rotatably mounted via suitable bearings 36 in each half of the cylinder block 11 so that during rotation, the swash plate 34 rotates and causes reciprocation of the pistons 28 in the respective sleeves 21. During this time, the respective heads 35 slide within the hemi-cylindrical recesses 32 of the shoe 31. In addition, the head 12 at the right-hand side, as viewed, receives a mounting plate 37 within which an anti-friction bearing 38 is mounted to rotatably receive and guide the shaft 33 through the head 12. The end of the shaft 33 may be connected in any suitable manner to a power take-off means (not shown) e.g. via a gear 39 fixed to the end of the shaft 33 by an end cap 40 and bolt 41.

Figure 3:
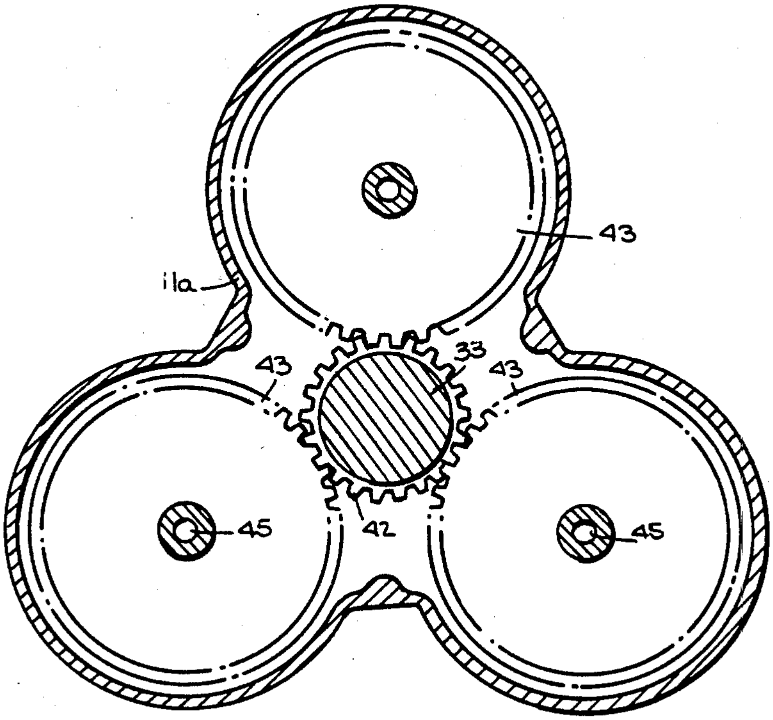
FIG. 3 illustrates a view taken on line 3—3 of FIG. 1.

The transmission also includes a means such as a gear train for rotating each sleeve 21 about the axis 22 thereof such that each sleeve 21 rotates at one-half the speed of the shaft 33. As shown in FIGS. 1 and 3, the gear train includes a drive gear 42 which is mounted on the shaft 33 within each cylinder block half 11*a*, 11*b* and driven gears 43 which are secured to each of the rotatable sleeves 21. Each drive gear 42 is longer i.e. thicker, than the driven gears 43 to permit the driven gears 43 to move axially relative to the drive gears 42 without disengaging.

As shown, each driven gear 43 has an elongated hub 44 through which a bore 45 passes and is secured to an annular collar 46 extending from the rear of the sleeve 21 via bolts 47. In this way, rotation of the gear 43 causes rotation of the sleeve 21. In addition, the housing block half 11*a* has a mounting plate 48 secured thereon which carries a slide bearing 49 within which the hub 44 is journalled while the head 12 carries a similar slide bearing 49. The mounting plate 48 is also provided with a plurality of passages 50 for a use which will be explained below.

Referring to FIG. 1, the transmission operates so that the shaft 33 rotates twice, i.e. from a 0° position to a 720° position, while each sleeve 21 rotates once. During this time, a piston 28 performs four strokes, i.e. "filling", "compression", "power" and "exhaust". For example, for a given compression chamber 25, as the shaft moves from 0° to 180°, the sleeve 21 moves over an angle of 90° during most of which time the port 24 allows a combustible mixture into the chamber 23 from the intake ducts 16, 18 (see FIG. 2). At the same time, the piston head 29 is being withdrawn in a filling stroke from the chamber 23. Next, as the shaft 33 moves from 180° to 360°, the sleeve 21 moves a second 90° to move the port 24 away from the intake ducts 16, 18 while the piston head 29 returns in a compression stroke to compress the mixture in the chamber 23. The shaft 33 then moves from 360° to 540° while the sleeve 21 moves a third 90°. During this time, ignition takes place via the port 24 and the piston head 29 is expelled in a power stroke from the sleeve 21. Finally, the shaft 33 moves from 540° to 720° while the sleeve 21 moves a fourth 90° and communicates the port 24 with the exhaust duct 17. During this time, the piston head 29 moves back into the chamber 23 to exhaust the combusted mixture in the form of hot exhaust gases into the exhaust duct 17. The cycle then repeats.

As a note, for simplicity, ignition is described as taking place after the shaft passes the 360° position. However, it is well known that in gasoline engines, a spark plug might fire without much loss of efficiency as much as 40° of engine revolution before the piston reaches top dead center, i.e. before the end of the compression stroke. In a diesel engine, the fuel may be injected about 25° to 35° before top dead center.

The engine also has means for moving each sleeve 21 axially in the engine block 11 relative to the respective piston head 29 in order to adjust the volume of the compression chambers and thus, the compression ratio. Each means includes a piston 51 which is slidably mounted in a cylinder head 12 about the hub 44 of a gear 43. Each piston 51 carries an axial slide bearing sleeve 52 to slide relative to the hub 44 as well as a radial slide bearing plate 53 to slide relative to the rotatable gear 43. Suitable piston rings 54 are also provided for sliding of the piston 51 within the head 12.

Each piston 51 also carries a guide pin 55 which is slidably received in a bore 56 in the head 12 to restrain the piston 51 against rotation. As shown, each piston 51 is slidable within a chamber 56 defined by the head 12.

Each head 12 also has an inlet valve 57 (see the left-hand side of FIG. 1) through which a supply of a pressurized medium, e.g. oil, can be passed into the chamber 56 to move the piston 51 and, thus, the gear 43 and sleeve 21 towards a piston head 29. This has the effect of decreasing the size of the combustion chamber 14 and thereby increasing the pressure ratio. Each head 12 is also provided with a bleed valve 58 through which the pressure medium may escape from the chamber 56.

As shown in FIG. 1, the head 12 also has an inlet 59 aligned with each hub 44 so that a coolant, such as oil, can be passed into the hub bore 45. As indicated, the coolant is able to flow through the hub 44 and, thence, through the passages 60 in the piston collar 46 and the passages 50 in the mounting plate 49 into the space surrounding the gear 43 and shaft gear 42. Each hub 44 is also provided with radial bores 61 which communicate with the various bearing sleeves 49, 52 and, via bores 62 in the piston collar 46, with the sleeve 49.

Of note, the housing block half 11*a* is also provided with a coolant chamber 63 through which a coolant may flow in a suitable manner.

In use, in order to adjust the position of a rotatable sleeve 21 relative to a piston head 29 so as to adjust the size of volume of the compression chamber, the pressure medium, e.g. oil, is supplied under pressure from a suitable control means (not shown) via the valve 57 into the chamber 56. At this time, the increase in pressure forces the piston 51 to the left as viewed- against the face of a gear 43. The gear 43 and sleeve 21 move to the left towards the piston head 29 to reduce the size of the compression chamber.

In order to increase the size of the compression chamber, the oil pressure delivered to the chamber 56 is reduced. Thereafter, as the swash plate 34 moves the piston head 29 into the sleeve 21, the sleeve 21 moves towards the piston 51, i.e. to the right and against the pressure of the oil.

The shaft 33 may also be connected to a suitable transmission, for example via a clutch, so that power can be taken off the shaft 33. Any suitable starter motor may be connected to the shaft 33 to initiate starting up of the engine 11.

In operation, after starting via a starter motor (not shown), the shaft 33 is rotated so that fuel can be brought into at least two of the six compression chambers i.e. one chamber 14 on each side of the engine. Continued rotation of the shaft 33 allows the combustible mixtures in each of the filled compression chambers to be compressed, combusted and then exhausted in a 4-stroke cycle. This maintains rotation of the shaft 33 via the swash plate 34.

With six cylinder chambers, the pistons 28 can be equispaced about the swash plate 34 so that a power stroke is initiated for each 120° of movement of the shaft 33.

In order to maintain constant peak pressure during changes in load during operation, each of the sleeves 21 can be moved towards the respective piston heads 29 so as to reduce or increase the size of each compression chamber and, thus, change the compression ratio. For example, should the engine 11 be accelerated via a throttle (not shown) the charge to each compression chamber 14 is increased. However, at this time, each sleeve 21 is moved via the pressure operated piston 51 so as to increase the compression chamber volume and thereby change the compression ratio. Thus, peak pressure of the increased charge within each chamber remains constant.

The compression ratio may also be varied depending on the leanness of an air-fuel mixture delivered to the compression chambers such that the compression ratio is increased for leaner air-fuel mixtures and vice versa.

Figure 4:
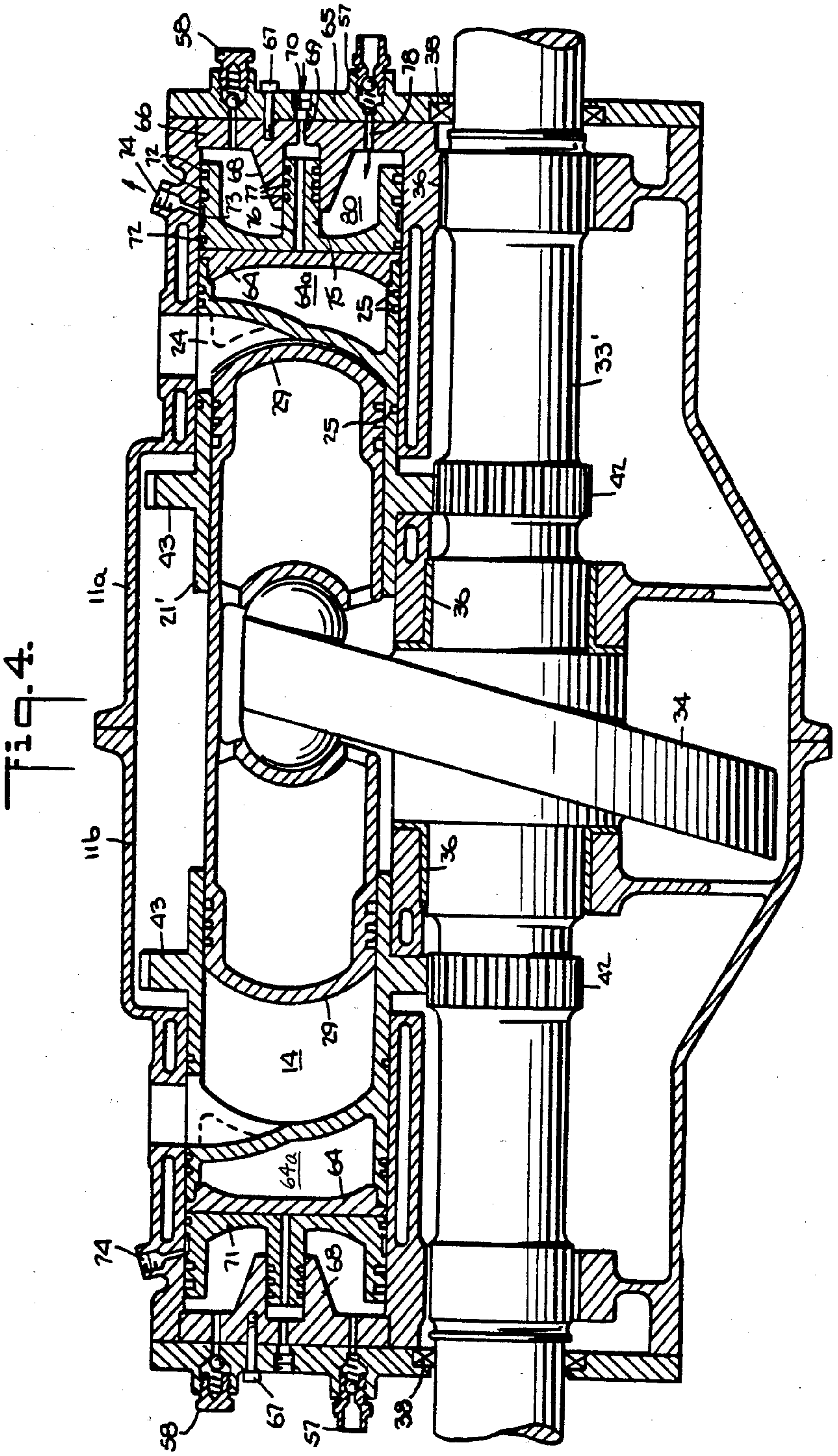
FIG. 4 illustrates a cross-sectional view similar to FIG. 1 of a modified engine according to the invention with a combined cylinder and rotary valve.

Referring to FIG. 4 wherein like reference characters indicate like parts as above, various modifications may be made in the engine 11.

For example, the main shaft 33' may extend through both ends of the engine block 11. Also, the driven gears 43 may be made integral with a rotary valve sleeve 21' and, each sleeve 21 may carry a plate 64 at one end to enclose a chamber **64*a*** and form a flat end.

Further, each housing block half **11*a*, 11*b* carries a plate 65 for closing off the ends of the housing 11 and in which a bearing 38 is mounted for the shaft 33'. Each plate 65 also has a block 66 secured thereto via bolts 67. Each block 66, in turn, has a central hub 68 as well as a central bore 69 through which a coolant may pass via an inlet 70 in the plate 65**.

In addition, a piston 71 is slidably mounted in the half **11*a* and carries suitable piston rings 72 as well as a fluid bearing 73 which is supplied via a port 74. The piston 71 also has a central stem 75 through which a bore 76 passes. This stem 76 is slidably mounted in the hub 68 of the block 66 and carries piston rings 77** thereon.

The closure plate 65 is provided with an inlet valve 57 and a bleed valve 58, as above, for each piston 71 while the block 66 is provided with bores 78, 79 which communicate each valve 57, 58 with a chamber 80 between the piston 71 and block 66.

In order to vary the compression ration of a combustion chamber 14, a pressurized media is introduced via the associated valve 57 into the chamber 80 in a manner as described above. This, in turn, causes the piston 71 and sleeve 21' to move towards the associated piston head 29'. A return movement is carried out in the same manner as above.

As shown in FIG. 4, each piston head 29' may have a hemi-spherical shape while the sleeve 21' has a mating cavity.

Figure 5:
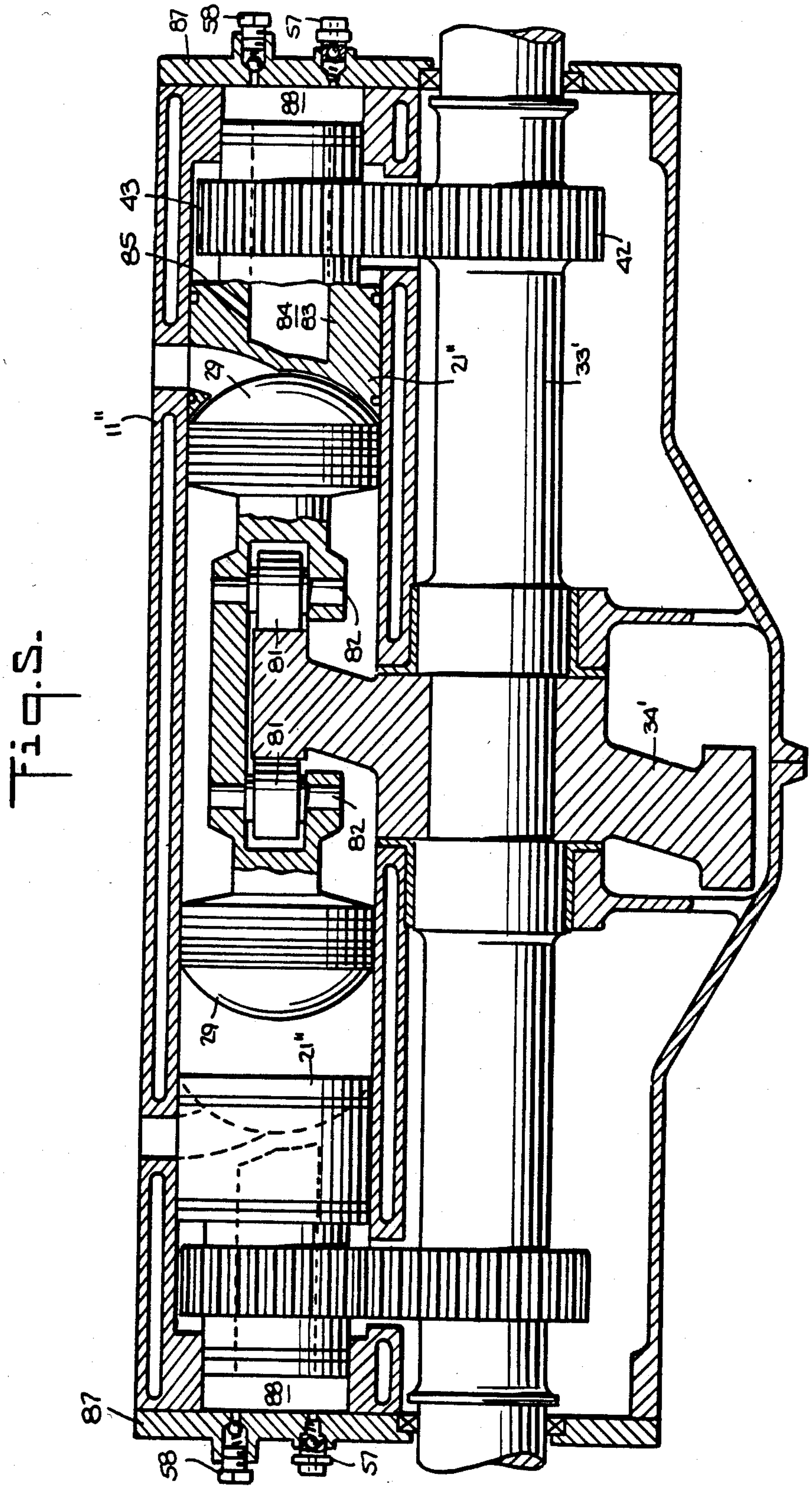
FIG. 5 illustrates a cross-sectional view of a modified engine according to the invention employing a 1:1 gear ratio between shaft and a rotary valve sleeve.

Referring to FIG. 5, wherein like reference characters indicate like parts as above, the engine may be constructed to operate with a 1:1 gear ratio between the main shaft 33 and the rotary valve sleeves 21". In this case, the swash plate 34' is provided with a sinusoidal face such that for each revolution, the four phases of operation, i.e. filling, compression, power and exhaust, are performed. To this end, the driven gears 43 are suitably sized relative to the drive gear 42.

As indicated in FIG. 5, the housing 11" is made of two or more pieces for assembly purposes and swash plate 34' drives each piston 28 via rollers 81 which are mounted on axles 82 secured within the piston 28.

Further, each rotary valve sleeve 21" has an annular extension 83 which is slidably mounted in the housing 11" and defines a recess 84. A bore 85 passes through the extension 83 to connect the recess 84 with the periphery of the extension 83. In addition, each gear 43 is mounted in an integral manner on the extension 83 of a respective sleeve 21" to be slidable within the housing 11". Also, a closure plate 87 is secured to the housing 11" to define a chamber 88 which communicates with the recess 84. As shown, this plate 87 carries an inlet valve 57 and a bleed valve 58.

In use, pressurized medium introduced via the inlet valve 57 fills the recess 84 and chamber 88 causing the sleeve 21" to move toward the piston head 29. The same medium also passes through the bore 85 to lubricate and cool the gears 43, 42.

Figure 6:
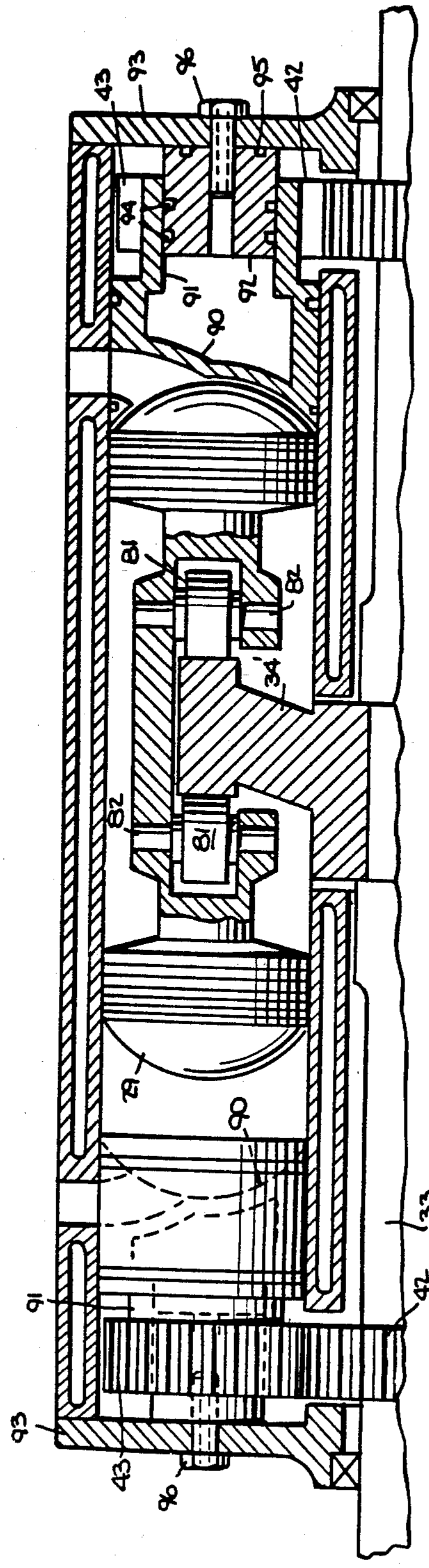
FIG. 6 illustrates a part cross-sectional view of a modified engine according to the invention employing a 1:1 gear ratio between shaft and a rotary valve sleeve.

Referring to FIG. 6, wherein like characters indicate like parts as above, each rotary valve sleeve 90 may be constructed with an annular extension 91 on which a gear 43 is formed while a block 92 is secured to a closure plate 93 to project into the interior of the extension 91. The block 92 is provided with annular rings 94 to facilitate sliding of the extension 91 relative to the block 92 as well as a seal ring 95 about a hollow bolt 96 which secures the block 92 to the plate 93. The bolt 96 serves to communicate a source of pressurized medium (not shown) with the interior of the extension 91 so that when the fluid is introduced, the sleeve 90 moves to the left as viewed.

Of note, a suitable check valve (not shown) is also provided to control the peak pressure delivered to the sleeve 90.

Figure 7:
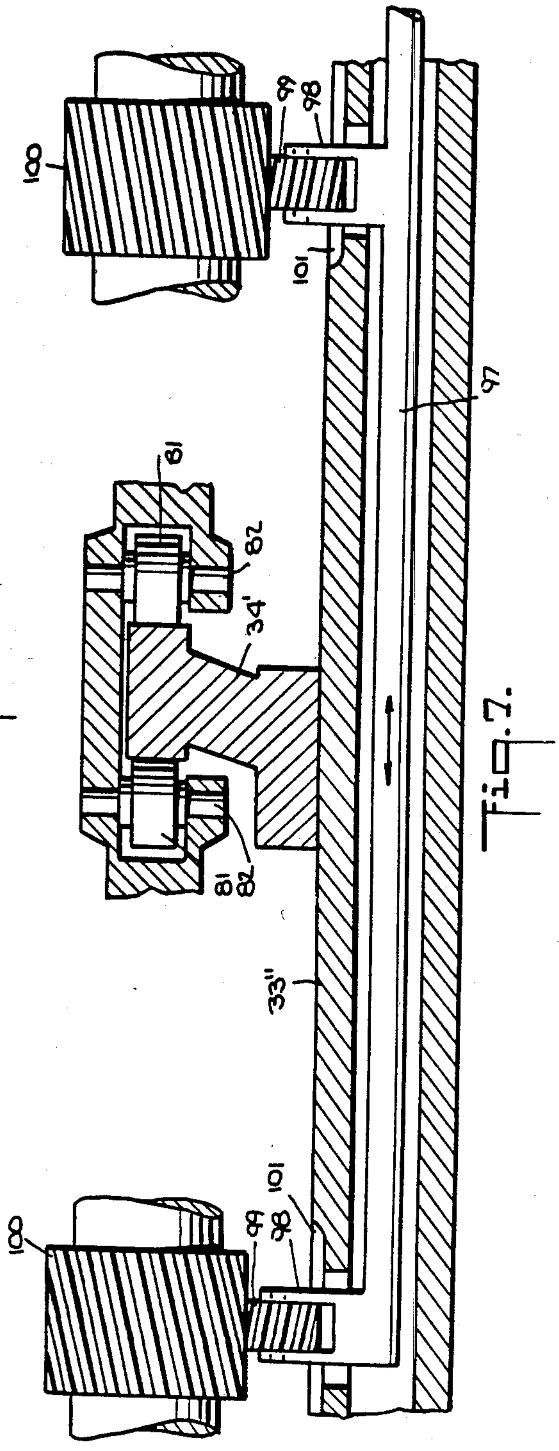
FIG. 7 illustrates a part cross-sectional view of a modified engine with a means to provide for variable valve timing in accordance with the invention.

Referring to FIG. 7, wherein like reference characters indicate like parts as above, means may be provided for varying the valve timing. To this end, the main shaft 33" is hollowed and a rod 97 is concentrically disposed in the shaft 33" for axial sliding relative to the shaft 33". In addition, the rod 97 carries a pair of forks 98, each of which projects radially through the main shaft 33 to cradle a helical drive gear 99 therein. Each gear 99 is meshed with a plurality of driven gears 100 (only one of which is shown) and is keyed on the shaft 33" via a spline 101 so as to be guided axially of the shaft 33".

Should the rod 97 be moved axially, the helical gears 99 are moved relative to the driven gears 100 to change the timing of the port in the respective rotary valve (not shown). In this regard, the gears 99, 100 at each end are formed to provide an identical valve timing on each end with a single rod movement.

Referring to FIG. 2, for a six cylinder engine, the inlet ducts 16, 18 and exhaust duct for each combustion chamber 14 are connected with suitable manifolds (not shown) at each end of the engine which are conveniently sized and mounted for the purposes intended.

Figure 8:
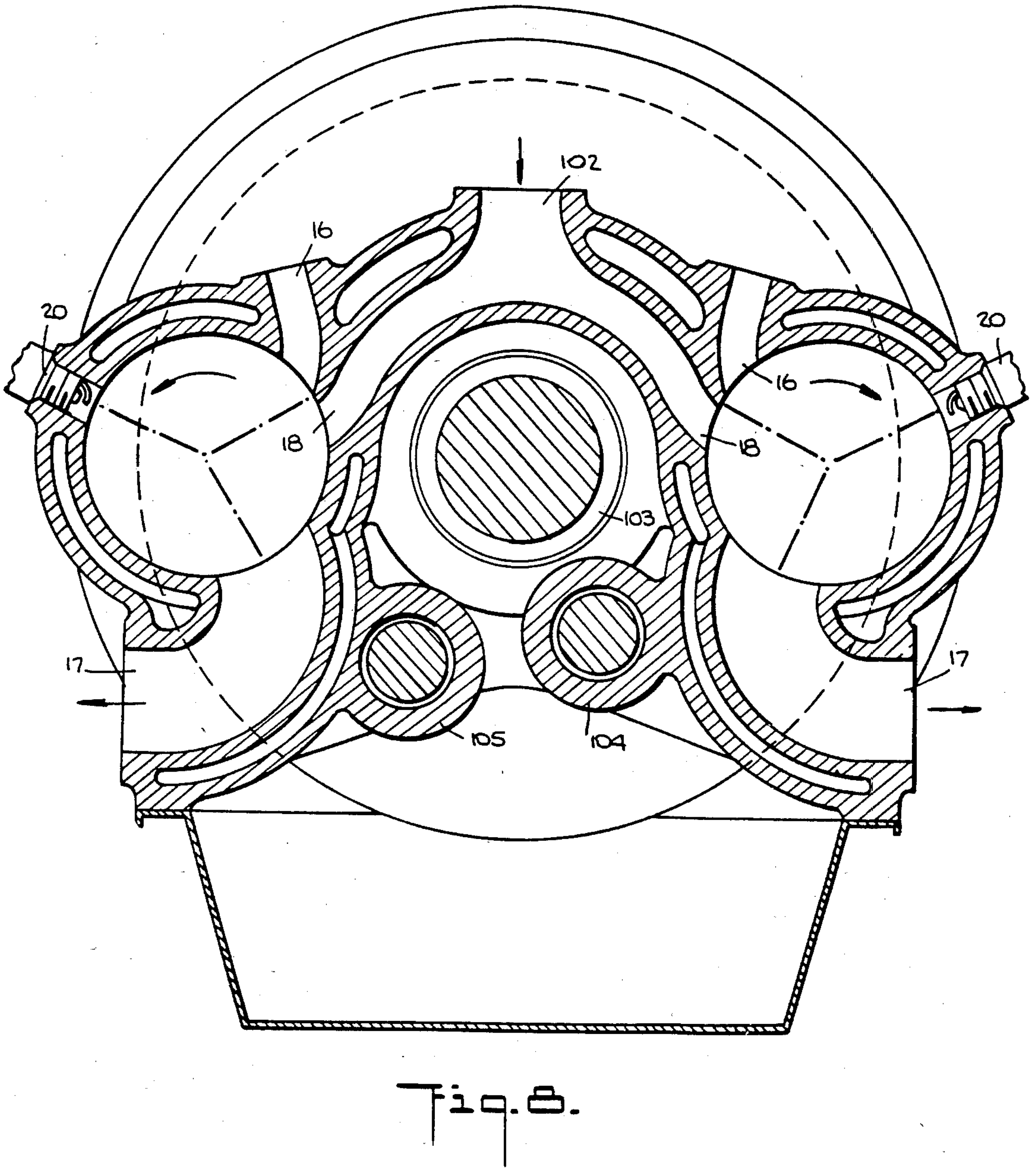
FIG. 8 illustrates a transverse cross-sectional view of a four-cylinder engine constructed in accordance with the invention.

Referring to FIG. 8, wherein like reference characters indicate like parts as above, where the engine is a four cylinder engine, the ducting and manifolding can be more compactly arranged. For example, the rotary valves at each end of the engine can be arranged in a mirror image to each other with the ducts 18 for the rich fuel/air mixture branching from a common inlet duct 102.

In order to rotate the rotary valves at each end in opposite directions, the main shaft gear 103 drives one driven gear 104 which, in turn, drives the other driven gear 105.

Of note, the engine is constructed so that all of the intake manifolds (not shown) are on one side of the engine. e.g. the top as viewed in FIG. 8, while all the exhaust manifolds (not shown) are on the opposite side, i.e. the bottom.

Figure 9:
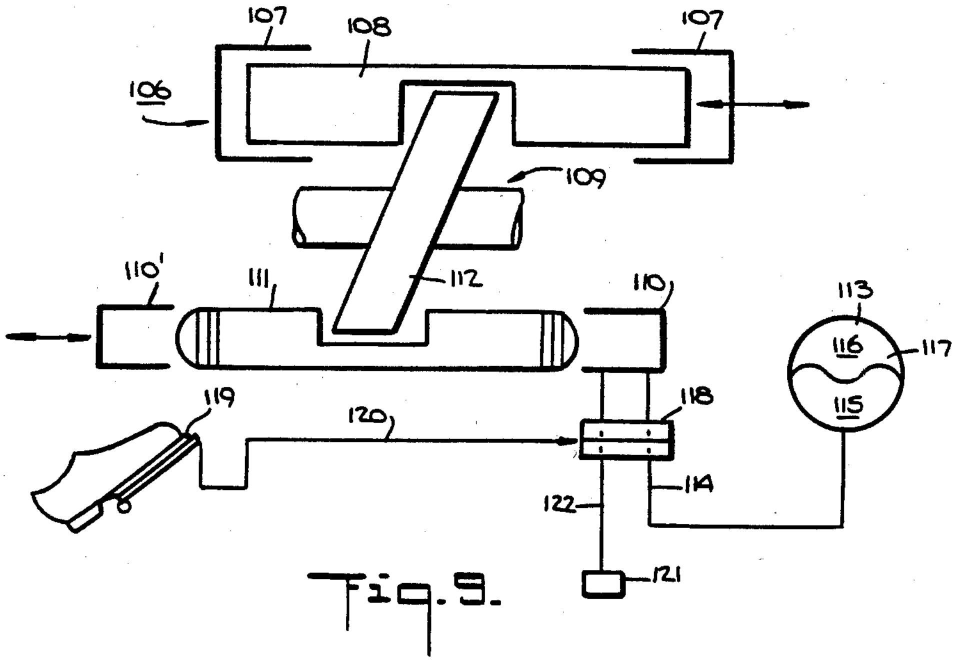
FIG. 9 illustrates a schematic view of an engine having a set of pistons connected with a hydraulic pump and motor for accelerating and/or starting of the engine in accordance with the invention.

Referring to FIG. 9, the engine may also be modified so that at least one pair of cylinder chambers and an associated piston can be used for braking, acceleration or starting purposes. For example, with the engine 106 constructed in a manner as described in any of the embodiments above described, i.e. with at least one pair of combustion chambers 107, a reciprocal piston 108 slidably disposed between and in the chambers 107 and means 109 for reciprocating the piston 108. As indicated, a second pair of cylinder chambers 110 with an associated reciprocal piston 111 is used for braking, acceleration or starting purposes. The piston, as above, is driven off the reciprocating means 109, for example via a swash plate 112 so as to reciprocate within the cylinder chambers 110.

In addition, an accumulator 113 is connected to the cylinder chamber 110, via a conduit 114 and to the chamber 110' via a similar conduit (not shown). The accumulator 113 has one chamber 115 for storing a pressure fluid, such as oil, and a second chamber 116 for storing a compressible gas, such as nitrogen. As indicated, the two chambers 115, 116 are separated from each other by a flexible diaphragm 117. The pressure of the oil and the pressure of the gas may be regulated in suitable manner so that the diaphragm 117 occupies a middle zone of the accumulator 113.

The conduit 114 connects the oil chamber 115 directly with the cylinder chamber 110 so as to convey a flow of oil therebetween. In this regard, a control valve 118 is disposed in the conduit 114 for controlling the flow of the oil. This control valve 118 is constructed so as to be operable between a pumping mode and a motor mode. When operating in the pumping mode, oil is pumped from the cylinder chamber 110 into the oil chamber 115 of the accumulator 113 so as to effect a braking action on the engine 106. When the control valve 118 is in the motor mode, pressure fluid is delivered from the oil chamber 115 of the accumulator 113 to the cylinder chamber 110 in order to aid in the acceleration or starting of the engine 106.

Any suitable means may be provided for switching the control valve 118 between the two modes. For example, as indicated, an accelerator pedal 119 may be connected via a line 120 to the control valve 118 so that the valve 118 may be modulated by the accelerator pedal position. For example, when the accelerator pedal 119 is released, the valve 118 is switched to the pumping mode. Thus, as the piston 111 moves into the cylinder 110, oil is pushed through the valve 118 and conduit 114 in the accumulator chamber 115 against the pressure of the gas in the chamber 116. This causes a braking of the engine while storing braking energy. When the accelerator pedal 119 is depressed, the valve 118 is switched to the motor mode. In this condition, the stored hydraulic energy is released from the accumulator 113 as oil passes from the accumulator chamber 115 into the cylinder chamber 110. This oil aids in driving the piston 111 in an outward manner from the cylinder 110. Thus, the hydraulic energy can be used to accelerate the engine or to start the engine.

The cylinder chamber 110' is connected to the accumulator 113 in similar fashion and operates with the accumulator 113 as described above.

The engine with the associated accumulator construction may be used in any suitable vehicle.

As indicated in FIG. 9, a suitable sump 121 may be connected via a line 122 through the valve 118 to the cylinder chamber 110.

Of note, the piston 111 and associated cylinder chambers 110,110' act as a high pressure hydraulic pump directly on the swash plate 112 when energy is being stored in the accumulator for a subsequent acceleration. Conversely, the piston 111 and cylinders 110, 110' function as a hydraulic motor in the motor mode.

This construction may be further modified so that when the engine is shut off, the engine continues to run automatically to fill the accumulator 113. The accumulated oil can then be used for starting. This drastically reduces the size of a battery which is usually used for starting of an engine and also eliminates the need for, for example, an electric starter. Further, the accelerator pedal 119 could be used to manually charge the accumulator 113 if the accumulator 113 has run down. It is estimated that the accumulation of the braking energy should add to the fuel economy of the engine.

The invention thus provides an engine which can easily be constructed to obtain a relatively high efficiency. In addition, the invention provides an engine using an Aspin type of rotary valve with a swash plate arrangement which is of efficient construction.

What is claimed is:

1. In combination with an engine having at least one pair of combustion chambers, a reciprocable piston slidably disposed between and in said chambers, and means for reciprocating said piston;

said second pair of cylinder chambers, a second reciprocable piston slidably disposed between and in said cylinder chambers and connected to said means for reciprocation thereby;

an accumulator having a first chamber for storing a pressure fluid therein, a second chamber for storing a compressible gas therein and a flexible diaphragm separating said first chamber from said second chamber;

a conduit connected to said first accumulator chamber with one of said cylinder chambers;

a control valve in said conduit for controlling a flow of pressure fluid between said accumulator and said one cylinder chamber; said control valve being operable between a pumping mode in which pressure fluid is pumped from said one cylinder chamber into said first accumulator chamber to brake said engine and a motor mode in which pressure fluid is delivered from said first accumulator chamber to said one cylinder chamber to accelerate said engine; and means for switching said control valve between said positions.

2. The combination as set forth in claim 1 wherein said means is an accelerator pedal.

3. The combination as set forth in claim 1 wherein said first accumulator chamber stores oil therein and said second accumulator chamber stores nitrogen therein.

* * * * *